(12) United States Patent
Inatomi et al.

(10) Patent No.: US 10,340,492 B2
(45) Date of Patent: Jul. 2, 2019

(54) ULTRAHIGH MOLECULAR WEIGHT POLYETHYLENE STRETCHED POROUS FILM

(71) Applicant: TOSOH CORPORATION, Shunan-shi, Yamaguchi (JP)

(72) Inventors: Kei Inatomi, Mie (JP); Yasutake Wakabayashi, Mie (JP); Shigehiko Abe, Mie (JP)

(73) Assignee: TOSOH CORPORATION, Shunan (JP)

( * ) Notice: Subject to any disclaimer, the term of this patent is extended or adjusted under 35 U.S.C. 154(b) by 333 days.

(21) Appl. No.: 15/128,772

(22) PCT Filed: Mar. 18, 2015

(86) PCT No.: PCT/JP2015/058003
§ 371 (c)(1),
(2) Date: Sep. 23, 2016

(87) PCT Pub. No.: WO2015/146733
PCT Pub. Date: Oct. 1, 2015

(65) Prior Publication Data
US 2017/0125763 A1  May 4, 2017

(30) Foreign Application Priority Data
Mar. 26, 2014  (JP) .................... 2014-063068

(51) Int. Cl.
| | | |
|---|---|---|
| *H01M 2/16* | (2006.01) | |
| *B01D 69/02* | (2006.01) | |
| *B01D 71/26* | (2006.01) | |
| *H01M 4/505* | (2010.01) | |
| *H01M 4/525* | (2010.01) | |
| *H01M 4/587* | (2010.01) | |
| *H01M 10/0525* | (2010.01) | |
| *H01M 10/0568* | (2010.01) | |
| *H01M 10/0569* | (2010.01) | |
| *B01D 53/22* | (2006.01) | |
| *H01M 4/131* | (2010.01) | |
| *H01M 4/133* | (2010.01) | |
| *H01M 4/583* | (2010.01) | |
| *H01M 10/0561* | (2010.01) | |

(52) U.S. Cl.
CPC ........ *H01M 2/1653* (2013.01); *B01D 53/228* (2013.01); *B01D 69/02* (2013.01); *B01D 71/26* (2013.01); *H01M 4/131* (2013.01); *H01M 4/133* (2013.01); *H01M 4/505* (2013.01); *H01M 4/525* (2013.01); *H01M 4/583* (2013.01); *H01M 4/587* (2013.01); *H01M 10/0525* (2013.01); *H01M 10/0561* (2013.01); *H01M 10/0568* (2013.01); *H01M 10/0569* (2013.01); *B01D 2325/24* (2013.01); *H01M 2300/002* (2013.01); *H01M 2300/0037* (2013.01)

(58) Field of Classification Search
CPC ........ B01D 69/00; B01D 69/02; B01D 71/00; B01D 71/06; B01D 71/26; B01D 53/228
See application file for complete search history.

(56) References Cited

U.S. PATENT DOCUMENTS

| | | | |
|---|---|---|---|
| 6,127,501 A * | 10/2000 | Fortuin | ................... A61L 15/24 |
| | | | 210/500.36 |
| 2006/0177643 A1 | 8/2006 | Kondo et al. | |
| 2006/0287449 A1 | 12/2006 | Miyamoto et al. | |

FOREIGN PATENT DOCUMENTS

| | | |
|---|---|---|
| JP | 9-291112 | 11/1997 |
| JP | 2004-352863 | 12/2004 |
| JP | 2005-225919 | 8/2005 |
| JP | 2006-36988 | 2/2006 |
| JP | 2011-124177 | 6/2011 |
| JP | 4868853 | 11/2011 |
| JP | 2012-25817 | 2/2012 |
| WO | WO 2004/024809 | 3/2004 |
| WO | WO-2004024809 A1 * | 3/2004 ............. B29C 55/18 |

(Continued)

OTHER PUBLICATIONS

International Preliminary Report on Patentability issued in PCT/JP2015/058003 dated Sep. 27, 2016.
International Search Report for PCT/JP2015/058003 dated Jun. 16, 2015, 2 pages.
Office Action issued in JP Appln. No. 2015-050675 dated Sep. 4, 2018 (w/ machine translation).

*Primary Examiner* — Eli S Mekhlin
(74) *Attorney, Agent, or Firm* — Nixon & Vanderhye P.C.

(57) ABSTRACT

To provide an ultrahigh molecular weight polyethylene stretched microporous film having high strength and heat resistance.

An ultrahigh molecular weight polyethylene stretched microporous film, which comprises at least an ultrahigh molecular weight polyethylene having an intrinsic viscosity ($[\eta]$) of at least 7 dl/g and at most 60 dl/g, and which has a porosity of at least 10% and at most 70% and a breaking stress of at least 1 MPa when melt-stretched at 150° C., which uses, as the ultrahigh molecular weight polyethylene, preferably ultrahigh molecular weight polyethylene particles which satisfy (1) an intrinsic viscosity ($[\eta]$) of at least 7 dl/g and at most 60 dl/g, (2) a bulk density of at least 130 kg/m$^3$ and at most 700 kg/m$^3$, and (3) $\Delta$Tm ($\Delta$Tm=Tm$_1$−Tm$_2$) of at least 9° C. and at most 30° C., which is a difference between the melting point (Tm$_1$) at the 1st scanning and the melting point (Tm$_2$) at the 2nd scanning measured by DSC.

8 Claims, No Drawings

(56) References Cited

FOREIGN PATENT DOCUMENTS

| WO | WO 2004/081064 | 9/2004 |
|---|---|---|
| WO | WO 2004/085525 | 10/2004 |

\* cited by examiner

# ULTRAHIGH MOLECULAR WEIGHT POLYETHYLENE STRETCHED POROUS FILM This application is the U.S. national phase of International Application No. PCT/JP2015/058003 filed 18 Mar. 2015 which designated the U.S. and claims priority to JP Patent Application No. 2014-063068 filed 26 Mar. 2014, the entire contents of each of which are hereby incorporated by reference.

TECHNICAL FIELD

The present invention relates to a ultrahigh molecular weight polyethylene stretched microporous film which has a high melting point and high strength and which can be made thin, preferably a stretched microporous film which is formed by ultrahigh molecular weight polyethylene particles having a high melting point and showing high crystallinity, more particularly, an ultrahigh molecular weight polyethylene stretched microporous film which is excellent in strength and heat resistance and is thereby expected as a permeable membrane, a separation membrane, a battery separator, etc.

BACKGROUND ART

An ultrahigh molecular weight ethylene polymer, which has a very high molecular weight corresponding to a viscosity average molecular weight (Mv) of at least 1,000,000, is excellent in the impact resistance, self-rubricating properties, abrasion resistance, weather resistance, chemical resistance, dimensional stability, etc., and has high physical properties equal to those of an engineering plastic. Accordingly, its application to lining materials, line members for the food industry, machine components, artificial joint, sports goods, microporous membranes, etc., by various forming methods, has been attempted.

However, an ultrahigh molecular weight ethylene polymer has very low fluidity when melted due to its high molecular weight, and can hardly be formed by melt extrusion like a common polyethylene having a molecular weight of from several tens of thousands to about 500,000. Accordingly, for an ultrahigh molecular weight polyethylene, a method of directly sintering a polymer powder obtained by polymerization, a method of compression molding the powder, a molding method by a ram extruder of extruding the powder while intermittently compressing the powder, or a method of extruding the powder as dispersed in a solvent or the like and then removing the solvent, may, for example, be conducted.

Among them, it is known that by the method of extruding the powder as dispersed in a solvent or the like and removing the solvent, a porous film can be produced by monoaxial and biaxial stretching before and after removal of the solvent. And, the ultrahigh molecular weight polyethylene microporous film thus obtained is expected to have excellent physical properties such as heat resistance, strength and impact resistance due to the high molecular weight of the ultrahigh molecular weight polyethylene. However, a ultrahigh molecular weight polyethylene produced by a Ziegler catalyst commercially available at present has a ratio (molecular weight distribution) of the weight average molecular weight (Mw) and the number average molecular weight (Mn) of higher than 4 and has a broad molecular weight distribution, and accordingly the molded product obtained from the polyethylene may not have sufficiently improved strength and heat resistance and does not necessarily have expected performance.

Further, an ultrahigh molecular weight ethylene polymer having a narrow molecular weight distribution produced by using a metallocene catalyst or a post-metallocene catalyst has been proposed (for example, Patent Documents 1 and 2).

PRIOR ART DOCUMENTS

Patent Documents

Patent Document 1: Japanese Patent No. 4,868,853
Patent Document 2: JP-A-2006-36988

DISCLOSURE OF INVENTION

Technical Problem

However, in a case where a stretched microporous film is produced by using the ultrahigh molecular weight polyethylene disclosed in Patent Document 1 or 2, the polyethylene is inferior in moldability and is hardly stretched and the performance of the microporous film is not sufficiently satisfactory.

Further, entanglement of molecular chains of a common ultrahigh molecular weight polyethylene is hardly dissolved as the molecular weight is higher, and accordingly effects expected by an increase of the molecular weight cannot sufficiently be obtained, the strength is maximum with a molecular weight at a level of from 1,000,000 to 3,000,000, and the strength is rather decreased even when the molecular weight is further increased.

Under these circumstances, it is an object of the present invention to provide an ultrahigh molecular weight polyethylene stretched microporous film excellent in strength and heat resistance.

Solution to Problem

The present inventors have conducted extensive studies to achieve the above object and as a result, found that a specific stretched microporous film comprising novel ultrahigh molecular weight polyethylene particles preferably having a specific melting behavior is a microporous film excellent in strength, heat resistance and durability, and accomplished the present invention.

That is, the present invention provides the following [1] to [15].

[1] An ultrahigh molecular weight polyethylene stretched microporous film, which comprises at least an ultrahigh molecular weight polyethylene having an intrinsic viscosity ($[\eta]$) of at least 7 dl/g and at most 60 dl/g, and which has a porosity of at least 10% and at most 70% and a breaking stress of at least 1 MPa when melt-stretched at 150° C.

[2] The ultrahigh molecular weight polyethylene stretched microporous film according to the above [1], wherein with respect to endothermic peaks by fusing at the 1st scanning when heated from 0° C. to 230° C. at a temperature-raising rate of 10° C./min (1st scanning) by a differential scanning calorimeter (DSC), the proportion ($\Delta H_{>135}/\Delta H_{whole}$), of the heat of fusion ($\Delta H_{>135}$) at 135° C. or higher based on the total heat of fusion ($\Delta H_{whole}$) is at least 40%.

[3] The ultrahigh molecular weight polyethylene stretched microporous film according to the above [1] or [2], which uses, as the ultrahigh molecular weight polyethylene, at least ultrahigh molecular weight polyethylene particles which satisfy all of the following conditions (1) to (3):

(1) an intrinsic viscosity ([η]) of at least 7 dl/g and at most 60 dl/g;

(2) a bulk density of at least 130 kg/m³ and at most 700 kg/m³; and (3) a difference (ΔTm=$Tm_1$−$Tm_2$) between $Tm_1$ and $Tm_2$ of at least 9° C. and at most 30° C., where $Tm_1$ is the melting point at the 1st scanning when heated from 0° C. to 230° C. at a temperature-raising rate of 10° C./min (1st scanning) by DSC, and $Tm_2$ is the melting point at the 2nd scanning when left to stand for 5 minutes after the 1st scanning, cooled to −20° C. at a temperature-decreasing rate of 10° C./min, left to stand for 5 minutes, and then heated from −20° C. to 230° C. at a temperature-raising rate of 10° C./min (2nd scanning).

[4] The ultrahigh molecular weight polyethylene stretched microporous film according to any one of the above [1] to [3], which uses, as the ultrahigh molecular weight polyethylene, at least ultrahigh molecular weight polyethylene particles which satisfy all of the following conditions (1') to (3'):

(1') an intrinsic viscosity ([η]) of at least 15 dl/g and at most 60 dl/g;

(2) a bulk density of at least 130 kg/m³ and at most 700 kg/m³; and (3') a difference (ΔTm=$Tm_1$−$Tm_2$) between $Tm_1$ and $Tm_2$ of at least 11° C. and at most 30° C., measured in the same manner as the above (3).

[5] The ultrahigh molecular weight polyethylene stretched microporous film according to any one of the above [1] to [4], which comprises an ultrahigh molecular weight polyethylene composition containing at least an ultrahigh molecular weight polyethylene having an intrinsic viscosity ([η]) of at least 7 dl/g and at most 60 dl/g and a polyethylene having a weight average molecular weight of at most 800,000.

[6] The ultrahigh molecular weight polyethylene stretched microporous film according to the above [5], which comprises an ultrahigh molecular weight polyethylene composition having [η] of at most 0.75 time [η] of the ultrahigh molecular weight polyethylene component, and wherein with respect to endothermic peaks by fusing when heated from 0° C. to 230° C. at a temperature-raising rate of 10° C./min by DSC, the proportion ($\Delta H_{>135}/\Delta H_{whole}$) of the heat of fusion ($\Delta H_{>135}$) at 135° C. or higher based on the total heat of fusion ($\Delta H_{whole}$) is at least 40% and at most 80%, and the $\Delta H_{whole}$ is at least 190 J/g.

[7] The ultrahigh molecular weight polyethylene stretched microporous film according to the above [5] or [6], wherein, when heated from 0° C. to 230° C. at a temperature-raising rate of 10° C./min by DSC, within ranges of at most 134° C. and at least 140° C., there is a temperature at which the endothermic heat flux (W/g) is at least 60% of the maximum heat flux (W/g).

[8] The ultrahigh molecular weight polyethylene stretched microporous film according to any one of the above [1] to [7], which has a tensile break strength measured at 23° C. of at least 150 MPa and a heat shrinkage of at most 2%.

[9] The ultrahigh molecular weight polyethylene stretched microporous film according to any one of the above [1] to [8], which has a film thickness of at most 15 μm, and which constitutes, when employed as a separator for a lithium ion secondary battery, a lithium ion secondary battery having a direct current resistance of at most 10 Ω·cm² and having a charge and discharge efficiency (=discharge capacity/charge capacity×100) of at least 95% when charged and discharged at a constant current (0.5 C) at which the fully charged lithium ion secondary battery is discharged in 2 hours.

[10] The ultrahigh molecular weight polyethylene stretched microporous film according to any one of the above [3] to [9], which uses, as the ultrahigh molecular weight polyethylene, ultrahigh molecular weight polyethylene particles which also satisfy such a condition that (4) a sheet formed by heat-rolling the particles at a pressing temperature of 190° C. under a pressing pressure of 20 MPa, followed by cooling at a mold temperature lower by 10° C. to 30° C. than the melting point ($Tm_2$) at the 2nd scanning measured by the above (3), has a tensile break strength (TS (MPa)) satisfying the following formula (a):

$$TS \geq 1.35 \times Tm_2 - 130 \tag{a}$$

[11] The ultrahigh molecular weight polyethylene stretched microporous film according to any one of the above [3] to [10], which uses, as the ultrahigh molecular weight polyethylene, ultrahigh molecular weight polyethylene particles which also satisfy such a condition that (5) a sheet formed by heat-rolling has a breaking stress (MTS (MPa)) of at least 1.5 MPa when melt-stretched at 150° C.

[12] The ultrahigh molecular weight polyethylene stretched microporous film according to any one of the above [3] to [11], which uses, as the ultrahigh molecular weight polyethylene, ultrahigh molecular weight polyethylene particles which also satisfy such a condition that (6) the breaking stress (MTS (MPa)) when melt-stretched measured by the above (5) and the intrinsic viscosity ([η]) satisfy the following formula (b):

$$MTS \geq 0.11 \times [\eta] \tag{b}$$

[13] The ultrahigh molecular weight polyethylene stretched microporous film according to any one of the above [1] to [12], which is obtained by mixing the ultrahigh molecular weight polyethylene particles or the ultrahigh molecular weight polyethylene composition and an organic solvent at a temperature of at least 50° C. and at most 300° C. to form a sheet-shaped product, subjecting the sheet-shaped product to biaxial stretching at a draw ratio of at least 2 times×2 times, and removing the organic solvent.

[14] The ultrahigh molecular weight polyethylene stretched microporous film according to any one of the above [1] to [13], which is at least one member selected from the group consisting of a gas separation membrane, a semipermeable membrane, a tape, a tube and a battery separator.

[15] A separator for a lithium ion secondary battery made of an ultrahigh molecular weight polyethylene, which constitutes, when applied to a lithium ion secondary battery using cobalt/manganese/nickel composite oxide-lithium as a cathode, graphite as an anode and LiPF6/ethyl carbonate/diethyl carbonate as an electrolyte, a lithium ion secondary battery having a direct current resistance of at most 10 Ω·cm² and having a charge and discharge efficiency (=discharge capacity/charge capacity×100) of at least 95% when charged and discharged at a constant current corresponding to 0.5 C, and which has a porosity of from 10 to 70%, a breaking stress of at least 1 MPa when melt-stretched at 150° C. and a film thickness of at most 15 μm.

DESCRIPTION OF EMBODIMENTS

Now, the present invention will be described in further detail.

The ultrahigh molecular weight polyethylene stretched microporous film of the present invention comprises at least an ultrahigh molecular weight polyethylene having [η] of at least 7 dl/g and at most 60 dl/g, and has a porosity of at least 10% and at most 70% and a breaking stress of at least 1 MPa when melt-stretched at 150° C. The ultrahigh molecular weight polyethylene constituting the ultrahigh molecular weight polyethylene stretched microporous film may be any ultrahigh molecular weight polyethylene prepared with a Ziegler-Natta catalyst, a metallocene catalyst or the like so long as it has [η] of at least 7 dl/g and at most 60 dl/g, and may be used as a composition with a common polyethylene. It is particularly preferably the after-described ultrahigh molecular weight polyethylene particles or their composition. Here, if [η] is less than 7 dl/g, the resulting stretched microporous film is inferior in dynamic properties. On the other hand, if [η] exceeds 60 dl/g, the polyethylene is inferior in fluidity at the time of molding and is thereby inferior in moldability when formed into a stretched microporous film. [η] may be measured at 135° C. with respect to a solution at a polymer concentration of from 0.0005 to 0.01% using as a solvent o-dichlorobenzene, decahydronaphthalene, tetrahydronaphthalene or the like using an Ubbelohde viscometer.

Further, the ultrahigh molecular weight polyethylene stretched microporous film of the present invention has a porosity of at least 10% and at most 70%, preferably at least 25% and at most 65%. If the stretched microporous film has a porosity of less than 10%, it has a high permeation resistance. On the other hand, if the stretched microporous film has a porosity exceeding 70%, it has low strength and low rigidity and is inferior in durability. The porosity in the present invention may be determined, for example, by porosity (V, %)=100−10×(weight of 10 cm×10 cm stretched microporous film) (W, g)/(true density (g/cm$^3$) of stretched microporous film×film thickness (d, mm) of stretched microporous film).

The ultrahigh molecular weight polyethylene stretched microporous film of the present invention has a breaking stress of at least 1 MPa when melt-stretched at 150° C., preferably at least 2 MPa, whereby the film is excellent in heat resistance and melt elasticity. When it has a breaking stress of less than 1 MPa when melt-stretched, it is inferior in heat resistance and durability at high temperature. The breaking stress when melt-stretched at 150° C. in the present invention may be measured, for example, by a tensile test with a heating furnace. The breaking stress may be measured under measurement conditions such that a test piece having an initial length of 10 mm is stretched at a stretch rate of from 10 to 50 mm/min.

The ultrahigh molecular weight polyethylene stretched microporous film of the present invention is such that with respect to endothermic peaks by fusing at the 1st scanning when 1st scanning is carried out by DSC, the proportion ($\Delta H_{>135}/\Delta H_{whole}$) of the heat of fusion (J/g) at 135° C. or higher (hereinafter referred to as $\Delta H_{>135}$) based on the total heat of fusion (J/g) (hereinafter referred to as $\Delta H_{whole}$) is at least 40%, whereby the film is particularly excellent in heat resistance and durability at high temperature.

The ultrahigh molecular weight polyethylene stretched microporous film of the present invention preferably has a tensile break strength measured at 23° C. of at least 150 MPa, whereby the film is particularly excellent in the strength and can be made thin. Further, it preferably has a heat shrinkage of at most 2%, whereby it is excellent in heat resistance, durability at high temperature and stability. The tensile break strength in the present invention may be measured, for example, by a tensile tester. The tensile break strength may be measured under measurement conditions such that a test specimen having an initial length of 20 mm is stretched at a stretch rate of from 10 to 100 mm/min. Further, the heat shrinkage may be measured, for example, in such a manner that a 5 cm square microporous film is heated at 100° C. for one hour, left to cool for 24 hours, thereafter the shrinkage is measured.

The ultrahigh molecular weight polyethylene stretched microporous film of the present invention preferably uses, with a view to efficiently obtaining one particularly excellent in heat resistance and durability at high temperature, at least ultrahigh molecular weight polyethylene particles which satisfy all of the conditions (1) [η] of at least 7 dl/g and at most 60 dl/g, (2) a bulk density of at least 130 kg/m$^3$ and at most 700 kg/m$^3$, (3) $\Delta Tm=Tm_1-Tm_2$ of at least 9° C. and at most 30° C., obtained by measuring $Tm_1$ at the 1st scanning when the 1st scanning is carried out by DSC, and $Tm_2$ at the 2nd scanning when the particles are left to stand for 5 minutes after the 1st scanning, cooled to −20° C. at a temperature-decreasing rate of 10° C./min, left to stand for 5 minutes, and then subjected to the 2nd scanning is carried out.

Further, the ultrahigh molecular weight polyethylene stretched microporous film of the present invention preferably uses at least ultrahigh molecular weight polyethylene particles which satisfy all the conditions (1') [η] of at least 15 dl/g and at most 60 dl/g, (2) a bulk density of at least 130 kg/m$^3$ and at most 700 kg/m$^3$, and (3') $\Delta Tm=Tm_1-Tm_2$ of at least 11° C. and at most 30° C., obtained by measuring $Tm_1$ at the 1st scanning when the 1st scanning is carried out by DSC, and $Tm_2$ at the 2nd scanning when the particles are left to stand for 5 minutes after the 1st scanning, cooled to −20° C. at a temperature-decreasing rate of 10° C./min, left to stand for 5 minutes and then subjected to the 2nd scanning.

Now, ultrahigh molecular weight polyethylene particles preferably used for the ultrahigh molecular weight polyethylene stretched microporous film of the present invention will be described.

The ultrahigh molecular weight polyethylene particles are composed of an ultrahigh molecular weight polyethylene in the form of particles, and as the ultrahigh molecular weight polyethylene, ones which fall into the category of polyethylene, for example, an ultrahigh molecular weight ethylene homopolymer; and an ultrahigh molecular weight ethylene-α-olefin copolymer such as an ultrahigh molecular weight ethylene-propylene copolymer, an ultrahigh molecular weight ethylene-1-butene copolymer, an ultrahigh molecular weight ethylene-1-hexene copolymer and an ultrahigh molecular weight ethylene-1-octene copolymer may be mentioned.

The ultrahigh molecular weight polyethylene particles have (1) [η] of at least 7 dl/g and at most 60 dl/g, preferably (1') at least 15 dl/g and at most 60 dl/g, particularly preferably at least 15 dl/g and at most 50 dl/g, whereby the resulting film has excellent moldability and dynamic properties as a microporous film. Here, if the particles have an intrinsic viscosity of less than 7 dl/g, the resulting stretched microporous film is inferior in dynamic properties. On the other hand, if the particles have an intrinsic viscosity exceeding 60 dl/g, the particles are inferior in fluidity at the time of molding and are thereby inferior in moldability when formed into a stretched microporous film. Here, [η] may be measured, for example, by using an Ubbelohde viscometer with respect to a solution at a polymer concentration of from 0.0005 to 0.01% using as a solvent e.g. o-dichlorobenzene, decahydronaphthalene or tetrahydronaphthalene, at 135° C.

Further, the ultrahigh molecular weight polyethylene particles preferably have (2) a bulk density of at least 130 kg/m$^3$ and at most 700 kg/m$^3$, whereby the particles have good fluidity when formed into a stretched microporous film, and the operation property will improve, such that the filling rate in storage facilities, a storage container and a hopper is excellent, and preferably have a bulk density of at least 200 kg/m$^3$ and at most 600 kg/m$^3$, whereby the particles are excellent in processability when formed into a stretched microporous film. The bulk density may be measured, for example, by a method in accordance with JIS K6760 (1995).

The ultrahigh molecular weight polyethylene particles preferably have (3) $\Delta Tm = Tm_1 - Tm_2$ of at least 9° C. and at most 30° C., obtained by measuring $Tm_1$ at the 1st scanning when the 1st scanning is carried out by DSC, and $Tm_2$ at the 2nd scanning when the particles are left to stand for 5 minutes after the 1st scanning, cooled to −20° C. at a temperature-decreasing rate of 10° C./min, left to stand for 5 minutes, and then subjected to the 2nd scanning, whereby the obtainable stretched microporous film is excellent in heat resistance, strength, etc., particularly preferably $\Delta Tm$ of at least 11° C. and at most 30° C., and more preferably $\Delta Tm$ of at least 11° C. and at most 15° C., whereby an ultrahigh molecular weight polyethylene stretched microporous film excellent in the balance of heat resistance, mechanical strength and moldability will be obtained.

Here, among common polyethylene, as a polyethylene having a high melting point, an ethylene homopolymer which falls in a category of a high density polyethylene has been known. However, the melting point of the high density polyethylene is low at a level of from 130 to 135° C. On the other hand, the ultrahigh molecular weight polyethylene particles suitable for the stretched microporous film of the present invention have a very high melting point (Tm) as compared with a conventional polyethylene, and for example, an ethylene homopolymer has a very high melting point of $Tm_1$ higher than 140° C. The ultrahigh molecular weight polyethylene particles are highly crystallized e.g. by orientation of molecular chains of the polyethylene, whereby $\Delta Tm$ which is a difference between $Tm_1$ and $Tm_2$ measured by DSC is so large as at least 9° C. and at most 30° C.

Further, the ultrahigh molecular weight polyethylene particles preferably have a low titanium content, particularly preferably a titanium content of at most 0.02 ppm or the detection limit or lower, whereby discoloration (yellowing), oxidative degradation and the like caused by titanium can be suppressed, and thus an ultrahigh molecular weight polyethylene stretched microporous film having favorable color tone and excellent in weather resistance can be obtained. The titanium content may be measured, for example, by chemical titration, fluorescence X-ray diffractomer, an ICP emission spectrometer or the like.

The ultrahigh molecular weight polyethylene particles preferably satisfy such a condition that (4) a sheet formed by heat-rolling the particles at a pressing temperature of 190° C. under a pressing pressure of 20 MPa, followed by cooling at a mold temperature lower by 10° C. to 30° C. than $Tm_2$ at the 2nd scanning measured by the above (3), has a tensile break strength (TS (MPa)) satisfying the following formula (a), whereby a tougher ultrahigh molecular weight polyethylene stretched microporous film can be provided, and the tensile break strength more preferably satisfies the following formula (c), whereby a further tougher ultrahigh molecular weight polyethylene stretched microporous film excellent in mechanical strength and abrasion resistance can be provided.

$$TS \geq 1.35 \times Tm_2 - 130 \qquad (a)$$

$$1.35 \times Tm_2 - 130 \leq TS \leq 2 \times Tm_2 - 175 \qquad (c)$$

Here, with respect to the tensile break strength of a common polyethylene, a high density polyethylene having the highest tensile break strength has a low tensile break strength at a level of 45 MPa. Further, a conventional ultrahigh molecular weight polyethylene cannot sufficiently make use of its high molecular weight and has a tensile break strength at the same level as a common polyethylene and not higher than 50 MPa. Accordingly, the strength was to be increased by orientation e.g. by rolling at a high draw ratio.

However, since polymer chains are moderately entangled in the ultrahigh molecular weight polyethylene particles, the tensile break strength of even an ultrahigh molecular weight polyethylene having [η] of higher than 7 dl/g, preferably higher than 15 dl/g does not decrease even if the molecular weight is further increased, but rather improves. And, the ultrahigh molecular weight polyethylene particles, which fall into the category of a high density polyethylene, has a tensile break strength measured by the above (4) of preferably at least 40 MPa, more preferably at least 50 MPa, since the strength is more excellent in the form of a film than in the form of particles.

The measurement conditions for the tensile break strength are not particularly limited, and for example, the tensile break strength may be measured, for example, with respect to a test piece in the form of a strip having a thickness of from 0.1 to 5 mm and a width of from 1 to 50 mm or in the form of a dumbbell, at a pulling rate of from 1 mm/min to 500 mm/min.

The ultrahigh molecular weight polyethylene particles preferably satisfy such a condition that (5) a sheet formed by heat-rolling has a breaking stress (MTS (MPa)) of at least 1.5 MPa when melt-stretched at a temperature higher by 20° C. than $Tm_2$ at the 2nd scanning measured by the above (3), more preferably at least 2 MPa, whereby the content of relatively low molecular weight components is low, polymer chains can be moderately entangled, and an ultrahigh molecular weight polyethylene stretched microporous film particularly excellent in heat resistance can be obtained.

Here, a common polyethylene having a molecular weight of at most 500,000 has high fluidity, its molded product deforms by its own weight, and it cannot be melt-stretched, at a temperature higher by 20° C. than the melting point (Tm). Further, a conventional ultrahigh molecular weight polyethylene may be melt-stretched even at a temperature higher by 20° C. than the melting point (Tm), however, it does not undergo strain hardening by the influence of low molecular weight components contained, it breaks with a stress of about 1 MPa while it is in a low stress state, and it is inferior in heat resistance in many cases.

Further, the molding conditions for a sheet formed by a heat-compression, to be used for melt stretching, are not particularly limited, and for example, conditions at a pressing temperature of from 100 to 250° C. and a pressing pressure of from 5 to 50 MPa, particularly, the heat compression conditions disclosed in the above (4) may, for example, be mentioned. Further, as a melt-stretching method, for example, a method may be mentioned in which a test piece in the form of a strip having a thickness of from 0.1 to 5 mm and a width of from 1 to 50 mm or in the form of a dumbbell is stretched at a pulling rate of from 1 mm/min to 500 mm/min. Further, as the breaking stress at the time of melt-stretching, in a case where strain hardening occurs and the stress increases along with stretching, the maximum value is taken as the breaking stress, and in a case where no strain hardening occurs and the stress does not increase even when the sheet is stretched, the stress in a flat region after the yield is taken as the breaking stress.

The ultrahigh molecular weight polyethylene particles preferably satisfy such a condition that (6) the breaking stress (MTS (MPa)) when melt-stretched measured by the above (5) and the intrinsic viscosity ([η]) satisfy the following formula (b), whereby an ultrahigh molecular weight polyethylene stretched microporous film particularly excellent in the heat resistance will be obtained, and preferably satisfy the following formula (d), whereby the film is particularly excellent also in melt stretchability and moldability.

$$MTS \geq 0.11 \times [\eta] \quad (b)$$

$$0.11 \times [\eta] \leq MTS \leq 0.32 \times [\eta] \quad (d)$$

The ultrahigh molecular weight polyethylene particles preferably have (7) an average particle size of at least 1 μm and at most 1,000 μm, whereby the particles are particularly excellent in fluidity as a powder, and an ultrahigh molecular weight polyethylene stretched microporous film excellent in moldability and physical properties will be obtained. The average particle size may be measured, for example, by a sieving test using standard sieves as defined in JIS Z8801.

As a method for producing the ultrahigh molecular weight polyethylene particles, any method may be employed so long as the ultrahigh molecular weight polyethylene particles can be produced, and for example, a method of homopolymerizing ethylene or copolymerizing ethylene and another olefin using a catalyst for producing polyethylene may be mentioned, and on that occasion, α-olefin may, for example, be propylene, 1-butene, 4-methyl-1-pentene, 1-hexene or 1-octene. Further, the polymerization method may, for example, be a solution polymerization method, a bulk polymerization method, a vapor-phase polymerization method or a slurry polymerization method, and among them, preferred is a slurry polymerization method, whereby ultrahigh molecular weight polyethylene particles having arranged particle shapes can be produced, and ultrahigh molecular weight polyethylene particles having a high melting point and high crystallinity and capable of forming an ultrahigh molecular weight polyethylene stretched microporous film excellent in mechanical strength, heat resistance and abrasion resistance can be efficiently and stably produced. Further, as the solvent to be used for the slurry polymerization method, any conventional organic solvent may be employed, and for example, benzene, toluene, xylene, pentane, hexane or heptane may be mentioned, and a liquefied gas such as isobutane or propane, or an olefin such as propylene, 1-butene, 1-octene or 1-hexene may be used as the solvent.

Further, the catalyst for producing polyethylene to be used for producing the ultrahigh molecular weight polyethylene particles may be any catalyst so long as the ultrahigh molecular weight polyethylene particles can be produced, and for example, a metallocene catalyst obtained from at least a transition metal compound (A), an organically modified clay (B) modified with an aliphatic salt and an organic aluminum compound (C) may be mentioned.

The transition metal compound (A) may, for example, be a transition metal compound having a (substituted) cyclopentadienyl group and a (substituted) fluorenyl group, a transition metal compound having a (substituted) cyclopentadienyl group and a (substituted) indenyl group, or a transition metal compound having a (substituted) indenyl group and a (substituted) fluorenyl group, and the transition metal in the compound may, for example, be zirconium or hafnium, and particularly preferred is a zirconium compound having a (substituted) cyclopentadienyl group and an amino group-substituted fluorenyl group, or a hafnium compound having a (substituted) cyclopentadienyl group and an amino group-substituted fluorenyl group, whereby the ultrahigh molecular weight polyethylene particles can be efficiently produced.

More specifically, it may, for example, be a zirconium compound such as diphenylmethylene(1-indenyl)(9-fluorenyl)zirconium dichloride, diphenylmethylene(1-indenyl)(2,7-di-t-butyl-9-fluorenyl)zirconium dichloride, diphenylmethylene(4-phenyl-1-indenyl)(2,7-di-t-butyl-9-fluorenyl) zirconium dichloride, diphenylsilanediyl(cyclopentadienyl) (2-(diethylamino)-9-fluorenyl)zirconium dichloride, diphenylsilanediyl(cyclopentadienyl)(2-(diethylamino)-9-fluorenyl)zirconium dichloride, diphenylsilanediyl(cyclopentadienyl)(2-(dibenzylamino)-9-fluorenyl)zirconium dichloride, diphenylsilanediyl(cyclopentadienyl)(2,7-bis(dimethylamino)-9-fluorenyl)zirconium dichloride, diphenylsilanediyl(cyclopentadienyl)(2,7-bis(diethylamino)-9-fluorenyl)zirconium dichloride, diphenylsilanediyl (cyclopentadienyl)(2,7-bis(dibenzylamino)-9-fluorenyl) zirconium dichloride, diphenylsilanediyl(cyclopentadienyl) (4-(dimethylamino)-9-fluorenyl)zirconium dichloride, diphenylsilanediyl(cyclopentadienyl)(4-(diethylamino)-9-fluorenyl)zirconium dichloride, diphenylsilanediyl(cyclopentadienyl)(4-(dibenzylamino)-9-fluorenyl)zirconium dichloride, diphenylmethylene(cyclopentadienyl)(2-(dimethylamino)-9-fluorenyl)zirconium dichloride, diphenylmethylene(cyclopentadienyl)(2-(diethylamino)-9-fluorenyl) zirconium dichloride, diphenylmethylene(cyclopentadienyl) (2-(dibenzylamino)-9-fluorenyl)zirconium dichloride, diphenylmethylene(cyclopentadienyl)(2,7-bis(dimethylamino)-9-fluorenyl)zirconium dichloride, diphenylmethylene(cyclopentadienyl)(2,7-bis(diethylamino)-9-fluorenyl) zirconium dichloride, diphenylmethylene(cyclopentadienyl) (2,7-bis(dibenzylamino)-9-fluorenyl)zirconium dichloride, diphenylmethylene(cyclopentadienyl)(4-(dimethylamino)-9-fluorenyl)zirconium dichloride, diphenylmethylene(cyclopentadienyl)(4-(diethylamino)-9-fluorenyl)zirconium dichloride, diphenylmethylene(cyclopentadienyl)(4-(dibenzylamino)-9-fluorenyl)zirconium dichloride, diphenylmethylene(cyclopentadienyl)(2,7-bis(dimethylamino)-9-fluorenyl)zirconium dichloride, diphenylmethylene (cyclopentadienyl)(2,7-bis(diethylamino)-9-fluorenyl) zirconium dichloride, diphenylmethylene(cyclopentadienyl) (2,7-bis(diisopropylamino)-9-fluorenyl)zirconium dichloride, diphenylmethylene(cyclopentadienyl)(2,7-bis (di-n-butyl-amino)-9-fluorenyl)zirconium dichloride, diphenylmethylene(cyclopentadienyl)(2,7-bis(dibenzylamino)-9-fluorenyl)zirconium dichloride, diphenylmethylene (cyclopentadienyl)(3,6-bis(dimethylamino)-9-fluorenyl) zirconium dichloride, diphenylmethylene(cyclopentadienyl) (3,6-bis(diethylamino)-9-fluorenyl)zirconium dichloride, diphenylmethylene(cyclopentadienyl)(3,6-bis(di-n-propylamino)-9-fluorenyl)zirconium dichloride, diphenylmethylene(cyclopentadienyl)(2,5-bis(dimethylamino)-9-fluorenyl) zirconium dichloride, diphenylmethylene(cyclopentadienyl) (2,5-bis(diethylamino)-9-fluorenyl)zirconium dichloride or diphenylmethylene(cyclopentadienyl)(2,5-bis(diisopropylamino)-9-fluorenyl)zirconium dichloride; a zirconium compound such as a dimethyl-form, a diethyl-form, a dihydro-form, a diphenyl-form or a dibenzyl-form of such a dichloro-form, or a hafnium compound having zirconium in such a compound converted to hafnium.

The organically modified clay (B) modified with an aliphatic salt may, for example, be a clay modified with an aliphatic salt such as an aliphatic amine salt such as N,N-dimethyl-behenylamine hydrochloride, N-methyl-N-ethyl-behenylamine hydrochloride, N-methyl-N-n-propyl-behenylamine hydrochloride, N,N-dioleyl-methylamine hydrochloride, N,N-dimethyl-behenylamine hydrofluoric acid salt, N-methyl-N-ethyl-behenylamine hydrofluoric acid salt, N-methyl-N-n-propyl-behenylamine hydrofluoric acid salt, N,N-dioleyl-methylamine hydrofluoric acid salt, N,N-dimethyl-behenylamine hydrobromate, N-methyl-N-ethyl-behenylamine hydrobromate, N-methyl-N-n-propyl-behenylamine hydrobromate, N,N-dioleyl-methylamine hydrobromate, N,N-dimethyl-behenylamine hydroiodic acid salt, N-methyl-N-ethyl-behenylamine hydroiodic acid salt, N-methyl-N-n-propyl-behenylamine hydroiodic acid salt, N,N-dioleyl-methylamine hydroiodic acid salt, N,N-dimethyl-behenylamine sulfate, N-methyl-N-ethyl-behenylamine sulfate, N-methyl-N-n-propyl-behenylamine sulfate, or N,N-dioleyl-methylamine sulfate; or an aliphatic phosphonium salt such as P,P-dimethyl-behenylphosphine hydrochloride, P,P-diethyl-behenylphosphine hydrochloride, P,P-dipropyl-behenylphosphine hydrochloride, P,P-dimethyl-behenylphosphine hydrofluoric acid salt, P,P-diethyl-behenylphosphine hydrofluoric acid salt, P,P-dipropyl-behenylphosphine hydrofluoric acid salt, P,P-dimethyl-behenylphosphine hydrobromate, P,P-diethyl-behenylphosphine hydrobromate, P,P-dipropyl-behenylphosphine hydrobromate, P,P-dimethyl-behenylphosphine hydroiodic acid salt, P,P-diethyl-behenylphosphine hydroiodic acid salt, P,P-dipropyl-behenylphosphine hydroiodic acid salt, P,P-dimethyl-behenylphosphine sulfate, P,P-diethyl-behenylphosphine sulfate or P,P-dipropyl-behenylphosphine sulfate.

Further, the clay compound constituting the organically modified clay (B) may be any compound which falls in the category of a clay compound, and it is commonly formed of a plurality of layers called silicate layers each composed of a tetrahedral sheet having silica tetrahedrons two-dimensionally connected to one another and an octahedral sheet having alumina octahedrons, magnesia octahedrons or the like two-dimensionally connected to one another in combination in 1:1 or 2:1 overlaid one on another, wherein Si in some of the silica tetrahedrons, Al of the alumina octahedrons and Mg of the magnesia octahedrons isomorphously substituted by Al, Mg, Li or the like, respectively, whereby the interior of the layers is insufficient in positive electric charge, and the entire layer is negatively charged, and to counteract the negative charge, cations such as $Na^+$ and $Ca^{2+}$ are present between layers. As the clay compound, kaolinite, talc, smectite, vermiculite, mica, brittle mica, chlorite and the like as natural products or synthetic products are present and can be used, and among them, in view of availability and easiness of organic modification, smectite is preferred, and among smectite, hectorite or montmorillonite is more preferred.

The organically modified clay (B) may be obtained by introducing the aliphatic salt between layers of the clay compound to form ion composites. When the organically modified clay (B) is prepared, the treatment is preferably carried out under conditions of a clay compound concentration of from 0.1 to 30 wt % and a treatment temperature of from 0 to 150° C. Further, the aliphatic salt may be prepared as a solid and dissolved in a solvent, or a solution of the aliphatic salt may be prepared by a chemical reaction in a solvent and used as it is. With respect to the reaction quantitative ratio of the clay compound and the aliphatic salt, it is preferred to use the aliphatic salt in an equivalent amount or more relative to the exchangeable cations of the clay compound. The treatment solvent may, for example, be an aliphatic hydrocarbon such as pentane, hexane or heptane; an aromatic hydrocarbon such as benzene or toluene; an alcohol such as ethyl alcohol or methyl alcohol; an ether such as ethyl ether or n-butyl ether; a halogenated hydrocarbon such as methylene chloride or chloroform; acetone; 1,4-dioxane; tetrahydrofuran; or water. It is preferred to use an alcohol or water by itself or as one component of the solvent.

Further, the particle size of the organically modified clay (B) constituting the catalyst for producing polyethylene is not limited, and is preferably from 1 to 100 μm in view of excellent efficiency at the time of preparation of the catalyst and efficiency at the time of producing polyethylene. The method for controlling the particle size is also not particularly limited, and large particles may be pulverized into appropriate particle sizes, or small particles may be granulated into appropriate particle sizes, or pulverization and granulation may be combined. Further, adjustment of the particle size may be applied to the clay before organic modification or may be applied to the organically modified clay after modification.

The organic aluminum compound (C) may be any compound which falls in the category of an organic aluminum compound and may, for example, be an alkyl aluminum such as trimethylaluminum, triethylaluminum or triisobutylaluminum.

The ratio of the transition metal compound (A) (hereinafter sometimes referred to as component (A)), the organically modified clay (B) (hereinafter sometimes referred to as component (B)) and the organic aluminum compound (C) (hereinafter sometimes referred to as component (C)) constituting the catalyst for producing polyethylene is not limited so long as the resulting catalyst can be used as a catalyst for producing polyethylene, and in order to form a catalyst for producing polyethylene with which the ultrahigh molecular weight polyethylene particles can be produced with good production efficiency, the molar ratio of the component (A) and the component (C) per metal atom is preferably component (A):component (C)=100:1 to 1:100,000, particularly preferably 1:1 to 1:10,000. Further, the weight ratio of the component (A) and the component (B) is preferably component (A):component (B)=10:1 to 1:10,000, particularly preferably 3:1 to 1:1,000.

As the method for preparing the catalyst for producing polyethylene, any method may be employed so long as a catalyst for producing polyethylene containing the components (A), (B) and (C) can be prepared, and for example, a method of mixing the components (A), (B) and (C) in a solvent inert to the components (A), (B) and (C) or by using a monomer to be polymerized as a solvent may be mentioned. The order of reaction of such components is not limited, and the temperature and the treatment time for the treatment are also not limited. Further, two or more types of each of the components (A), (B) and (C) may be used to prepare the catalyst for producing polyethylene.

At the time of producing the ultrahigh molecular weight polyethylene particles, the polymerization conditions such as the polymerization temperature, the polymerization time, the polymerization pressure and the monomer concentration may be optionally selected, and it is preferred to conduct the polymerization at a polymerization temperature of from 0 to 100° C., for a polymerization time of from 10 seconds to 20 hours under a polymerization pressure of from normal pressure to 100 MPa. Further, it is possible to adjust the molecular weight using hydrogen or the like at the time of polymerization. The polymerization may be conducted by the batch, semi-continuously or continuously, or may be conducted at two or more stages changing the polymerization conditions. The polyethylene particles obtained after completion of polymerization are separated and recovered from the polymerization solvent by a known method and dried.

The ultrahigh molecular weight polyethylene stretched microporous film of the present invention may comprise an ultrahigh molecular weight polyethylene composition containing an ultrahigh molecular weight polyethylene having [η] of at least 7 dl/g and at most 60 dl/g, and preferably comprises a composition with a polyethylene particularly a composition with a polyethylene having a weight average molecular weight of at most 800,000, whereby the obtainable film is excellent in heat resistance and durability at high temperature and can be made thin, and is also excellent in shutdown properties in an emergency when employed e.g. as a separator for a battery such as a lithium ion secondary battery. The polyethylene in the composition may be a common commercially available polyethylene. Further, as the composition with the polyethylene, preferred is an ultrahigh molecular weight polyethylene composition having [η] of at most 0.75 time [η] of the ultrahigh molecular weight polyethylene component.

In a case where the ultrahigh molecular weight polyethylene stretched microporous film of the present invention comprises the ultrahigh molecular weight polyethylene composition, preferred is an ultrahigh molecular weight polyethylene stretched microporous film wherein with respect to endothermic peaks by fusing when heated from 0° C. to 230° C. at a temperature-raising rate of 10° C./min by DSC, the proportion ($\Delta H_{>135}/\Delta H_{whole}$) of $\Delta H_{>135}$ (J/g) at 135° C. or higher based on $\Delta H_{whole}$ (J/g) is at least 40% and at most 80%, and the $\Delta H_{whole}$ is at least 190 J/g. Further, it is preferably an ultrahigh molecular weight polyethylene stretched microporous film wherein, when heated from 0° C. to 230° C. at a temperature-raising rate of 10° C./min by DSC, within ranges of at most 134° C. and at least 140° C., there is a temperature at which the heat flux (Wig) is at least 60% of the maximum heat flux (W/g).

The ultrahigh molecular weight polyethylene stretched microporous film of the present invention preferably has a film thickness of from 0.001 to 1 mm and an average pore size of from 1 to 1,000 nm. The film thickness (mm) of the stretched microporous film of the present invention may be obtained, for example, as an average of film thicknesses at 30 points of the stretched microporous film measured by a contact type film thickness meter. The average pore size may be obtained by a nitrogen adsorption method or a mercury intrusion method or by image analysis from an image obtained by observation with a scanning electron microscope.

Further, the ultrahigh molecular weight polyethylene stretched microporous film of the present invention is preferably one stretched at a draw ratio of 2 to 20 times in a longitudinal direction and from 2 to 20 times in a lateral direction.

Now, the method for producing the ultrahigh molecular weight polyethylene stretched microporous film of the present invention will be described. The method for producing the ultrahigh molecular weight polyethylene stretched microporous film of the present invention is not particularly limited, and for example, a method comprising a step of mixing the ultrahigh molecular weight polyethylene, the ultrahigh molecular weight polyethylene particles or the ultrahigh molecular weight polyethylene composition and an organic solvent at a temperature of at least 50° C. and at most 300° C. to form a sheet-shaped product and removing the organic solvent from the sheet-shaped product, and a step of applying biaxial stretching.

The organic solvent for producing the ultrahigh molecular weight polyethylene stretched microporous film may, for example, be a high boiling point aliphatic hydrocarbon or alicyclic hydrocarbon such as octane, decane, dodecane, octadecane, decahydronaphthalene or tetrahydronaphthalene; an aromatic hydrocarbon such as benzene, toluene, xylene or naphthalene; a halogenated hydrocarbon such as dichloroethane, trichloroethane, chlorobenzene or trichlorobenzene; a linear or branched liquid paraffin; a paraffin wax; a higher alcohol having at least 5 carbon atoms; a phthalic acid ester; or a mixture thereof. Further, when the ultrahigh molecular weight polyethylene, the ultrahigh molecular weight polyethylene particles or the ultrahigh molecular weight polyethylene composition and the organic solvent are mixed, the concentration of the ultrahigh molecular weight polyethylene, the ultrahigh molecular weight polyethylene particles or the ultrahigh molecular weight polyethylene composition is preferably at least 0.5 wt % and at most 60 wt %, particularly preferably at least 5 wt % and at most 40 wt %, whereby a stretched microporous film excellent in uniformity and smoothness can be obtained efficiently. Further, when the ultrahigh molecular weight polyethylene, the ultrahigh molecular weight polyethylene particles or the ultrahigh molecular weight polyethylene composition and the organic solvent are mixed, for example, a method of mixing them in a reaction tank equipped with a stirring blade, a method of extruding them by a single screw or twin screw extruder, or a method of mixing them in a reactor and then extruding the mixture may, for example, be mentioned. The obtained mixture is formed into a sheet-shaped product containing the organic solvent e.g. by compression molding, extrusion from e.g. a T-die or a circular die, or blown-film extrusion.

Further, as the step of removing the organic solvent from the sheet-shaped product, a drying method by heating, or a method of solvent extraction with a low boiling point aliphatic or alicyclic hydrocarbon, an alcohol, a halogenated hydrocarbon or the like, followed by drying may, for example, be mentioned. As the step of applying biaxial stretching, for example, a simultaneous biaxial stretching method or a successive biaxial stretching method may be mentioned, and in the biaxial stretching step, the stretching rate and the stretching temperature may be constant or changed stepwise. The stretching temperature is preferably at least 0° C. and at most 200° C. The order of the step of removing the organic solvent and the step of applying biaxial stretching is optional, and for example, the organic solvent is removed and then biaxial stretching is carried out, or biaxial stretching is carried out and then the organic solvent is removed, or the removal and biaxial stretching may be carried out simultaneously. Further, after stretching, annealing may be applied.

The ultrahigh molecular weight polyethylene stretched microporous film of the present invention may contain, within a range not to depart from the object of the present invention, a heat resistance-stabilizing agent, a weather resistance-stabilizing agent, an antistatic agent, an antifogging agent, an anti-blocking agent, a slip agent, a lubricant, a nucleating agent or a pigment; an inorganic filler or reinforcing agent such as carbon black, talc, a glass powder, glass fibers or a metal fiber; an organic filler or reinforcing agent; a flame retardant; a known additive such as a neutronshielding agent; or a resin such as a high density polyethylene (HDPE), a linear low density polyethylene (L-LDPE), a low density polyethylene (LDPE), a polypropylene resin, poly-1-butene, poly-4-methyl-1-pentene, an ethylene/vinyl acetate copolymer, an ethylene/vinyl alcohol copolymer, a polystyrene or a maleic anhydride graft thereof. As the method of adding such an additive, a method of blending the additive to the ultrahigh molecular weight polyethylene or the ultrahigh molecular weight polyethylene particles, a method of blending the additive with the ultrahigh molecular weight polyethylene or the ultrahigh molecular weight polyethylene particles at the time of forming, or a method of preliminarily dry-blending or melt-blending the additive may, for example, be mentioned.

The ultrahigh molecular weight polyethylene stretched microporous film of the present invention, which is excellent in strength and heat resistance, may be used as a member such as a gas separation membrane, a semipermeable membrane, a tape, a tube or a separator of a battery such as a lead acid battery, a nickel-metal hydride battery, a lithium battery or a lithium ion secondary batter.

The ultrahigh molecular weight polyethylene stretched microporous film of the present invention is excellent in heat resistance, durability at high temperature and stability, and when employed as a separator for a lithium ion secondary battery, it is particularly suitable since it can be downsized and light in weight by reduction in thickness and is excellent in the shutdown property in an emergency and in safety. When the ultrahigh molecular weight polyethylene stretched microporous film of the present invention is used as a separator for a lithium ion secondary battery, its film thickness is preferably at most 15 μm.

When the film is used to constitute a lithium ion secondary battery, as a cathode, a lithium metal oxide such as cobalt/manganese/nickel composite oxide-lithium may be mentioned, as an anode, a carbon material such as graphite may be mentioned, and as an electrolyte, for example, a 1M LiPF6 ethyl carbonate/diethyl carbonate solution may be mentioned. When a lithium ion secondary battery is constituted by using them, the film is preferably a separator which constitutes a lithium ion secondary battery having a direct current resistance of at most 10 Ω·m² calculated in such a manner that the lithium ion secondary battery in a state 50% charged based on the total capacity, is discharged for 10 seconds at a constant current corresponding to 0.5 C (a current at which the fully charged lithium ion secondary battery is discharged in 2 hours), 1 C (a current at which the fully charged lithium ion secondary battery is discharged in 1 hour) or 2 C (a current at which the fully charged lithium ion secondary battery is discharged in 0.5 hour), the application of the electric current is terminated, a voltage increase on that occasion is measured, and the direct current resistance is calculated from the current dependence (IR loss) of the voltage drop, and having a charge and discharge efficiency (=discharge capacity/charge capacity×100) of at least 95% when charged and discharged at a constant current (0.50) at which the fully charged lithium ion battery is discharged in 2 hours.

Advantageous Effects of Invention

The ultrahigh molecular weight polyethylene stretched microporous film obtained by the present invention, which is excellent in strength, heat resistance and durability at high temperature and can be formed into a thin film, is suitably employed as a gas separation membrane, a semipermeable membrane, a tap, a tube or a separator of a battery such as a lead acid battery, a nickel-metal hydride battery, a lithium battery or a lithium ion secondary battery.

EXAMPLES

Now, the present invention will be described in further detail with reference to Examples. However, it should be understood that the present invention is by no means restricted to such specific Examples.

Unless otherwise specified, reagents and the like were commercially available products or ones prepared in accordance with an existing method.

To pulverize the organically modified clay, a jet mill (manufactured by SEISHIN ENTERPRISE Co., Ltd., CO-JET SYSTEM a MARK III (trade name) was used, and the particle size after pulverization was measured using Microtrac particle size distribution measuring apparatus (manufactured by NIKKISO CO., LTD., MT3000 (trade name)) with ethanol as a dispersing agent.

Preparation of the catalyst for producing polyethylene, production of the polyethylene and purification of the solvent were conducted in an inert gas atmosphere. As a hexane solution (20 wt %) of triisobutyl aluminum, one manufactured by TOSOH FINECHEM CORPORATION was used.

Further, physical properties of the ultrahigh molecular weight polyethylene particles in Examples were measured by the following methods.

Measurement of Intrinsic Viscosity($[\eta]$)

It was measured by using ODCB (o-dichlorobenzene) as a solvent at 135° C. at an ultrahigh molecular weight polyethylene concentration of 0.005 wt %, using an Ubbelohde viscometer.

Measurement of Bulk Density

It was measured by a method in accordance with JIS K6760 (1995).

Measurement of $Tm_1$ and $Tm_2$

1st scanning was carried out by using DSC (manufactured by SII NanoTechnology, DSC6220 (trade name)) at a temperature-raising rate of 10° C./min, and the crystal melting peak ($Tm_1$) at the 1st scanning was measured. Then, the sample was left to stand for 5 minutes, cooled to −20° C. at a temperature-decreasing rate of 10° C./min, left to stand for 5 minutes and then subjected to the 2nd scanning, and the crystal melting peak ($Tm_2$) at the 2nd scanning was measured. In the measurement, the amount of the ultrahigh molecular weight polyethylene sample was from 4 to 6 mg.

Measurement of $\Delta H_{whole}$ and $\Delta H_{>135}$

Using DSC (manufactured by SII NanoTechnology, DSC6220 (trade name)), the 1st scanning at a temperature-raising rate of 10° C./min was carried out, and the heat of fusion ($\Delta H_{whole}$) of the entire crystal melting peak and the heat of fusion ($\Delta H_{>135}$) at 135° C. or higher at the 1st scanning were measured.

Measurement of Heat Flux by Adsorption of Heat by DSC

Using DSC (manufactured by SII NanoTechnology, DSC6220 (trade name)), the 1st scanning was carried out at a temperature-raising rate of 10° C./min, and the maximum endothermic heat flux at the 1st scanning, the heat flux at a temperature at which the endothermic heat flux was maximum at 135° C. or lower, and the heat flux at a temperature at which the endothermic heat flux was maximum at 140° C. or higher were obtained, and their ratios were obtained.

Measurement of Titanium Content

Using a solution prepared by ashing the ultrahigh molecular weight polyethylene, followed by alkali fusion, the titanium content in the ultrahigh molecular weight polyethylene was measured by an ICP emission spectrometer (manufactured by PerkinElmer Co., Ltd., Optima3000XL (trade name)).

Measurement of Average Particle Size

Using nine sieves (aperture sizes: 710 µm, 500 µm, 425 µm, 300 µm, 212 µm, 150 µm, 106 µm, 75 µm and 53 µm) defined in JIS Z8801, 100 g of ultrahigh molecular weight polyethylene particles were classified, the weights of the particles remaining on the respective sieves were integrated from a large aperture size side to obtain an integral curve, and the particle size at the 50% weight in the integral curve was measured and taken as the average particle size.

Preparation of Sheet for Evaluation of Ultrahigh Molecular Weight Polyethylene Particles A sheet for evaluation of the ultrahigh molecular weight polyethylene particles was formed by the following method. That is, the ultrahigh molecular weight polyethylene particles were sandwiched between polyethylene terephthalate films, preheated at 190° C. for 5 minutes and then heat-rolled at 190° C. under a pressing pressure of 20 MPa and then cooled at a mold temperature of 110° C. for 10 minutes to prepare a press sheet having a thickness of 0.3 mm.

Measurement of Film Thickness and Porosity of Stretched Microporous Film

The film thickness (d, mm) of the microporous film was an average of film thicknesses at 30 points of the microporous film measured by a contact type film thickness meter. The porosity (V, %) was calculated in accordance with the following formula (e) from the weight (W, g) of a 10 cm×10 cm microporous film and the true density (0.950 g/cm$^3$) of the porous film.

$$V = 100 - W/0.095d \quad (e)$$

Measurement of Pore Size Distribution of Stretched Microporous Film

The microporous film was gold-deposited and then its surface was observed with a scanning electron microscope (manufactured by KEYENCE CORPORATION, VE-9800 (trade name)) at 10,000-fold magnification, the pore size distribution was obtained by image analysis of the obtained SEM photograph, and the pore size distribution was approximated to the geometric logarithmic distribution function, and the median diameter was taken as the average pore size.

Measurement of Tensile Break Strength

A sample (width at the measurement portion: 5 mm) in the form of a dumbbell was cut out from each of the stretched microporous film and the sheet for evaluation of the ultrahigh molecular weight polyethylene particles, and each sample was left at rest at 23° C. for 48 hours and then subjected to a tensile test by a tensile tester (manufactured by A&D Company, Limited, TENSILON RTG-1210 (trade name)) at a measurement temperature 23° C. with an initial length of the test piece of 20 mm at a tensile rate of 20 mm/min to obtain the tensile break strength.

Measurement of Breaking Stress at Melt-Stretching

Each of samples (width at the measurement portion: 10 mm) in the form of a dumbbell cut out from each of the stretched microporous film and the sheet for evaluation of ultrahigh molecular weight polyethylene particles was left at rest at 23° C. for 48 hours and subjected to a tensile test by a tensile tester (manufactured A&D Company, Limited, TENSILON UMT2.5T (trade name)) at 150° C. with an initial length of the test piece of 10 mm at a tensile rate of 20 mm/min to obtain the breaking stress at the time of melt stretching. In a case where strain hardening occurred and the stress increased along with stretching, the maximum temperature was taken as the breaking stress, and in a case where no strain hardening occurred and the stress did not increase even when the sample was stretched, the stress in a flat region after the yield was taken as the breaking stress. In the case of the microporous film, a value obtained by dividing the load by an apparent initial cross sectional area was taken as the stress.

Measurement of Heat Shrinkage

The heat shrinkage was an average of the rates of change of longitudinal and lateral lengths after a 5 cm×5 cm microporous film was heated at 100° C. for one hour and slowly cooled to room temperature over 24 hours.

Evaluation of Battery Performance as Separator for Lithium Ion Secondary Battery Using the obtained stretched microporous film as a separator for a lithium ion secondary battery, a laminate lithium ion secondary battery (cathode: cobalt/manganese/nickel composite oxide-lithium, anode: graphite, electrolyte: 1M LiPF6 ethyl carbonate/diethyl carbonate (=1/1 vol %) solution, electrode size: 4 mm×4 mm, charge and discharge capacity: about 35 mA·h) was prepared, and its performance was evaluated. The obtained lithium ion secondary battery was subjected to 3 charge and discharge cycles to adjust the initial state, and then evaluated by measuring the direct current resistance and the charge and discharge efficiency (=discharge capacity−charge capacity×100)

(Direct current resistance): The lithium ion secondary battery in 50% charged state based on the entire capacity, was discharged for 10 seconds at a constant current corresponding to 0.5 C (a current at which the fully charged lithium ion secondary battery is discharged in 2 hours), 1 C (a current at which the fully charged lithium ion secondary battery is discharged in one hour) or 2 C (a current at which the fully charged lithium ion secondary battery was discharged in 0.5 hour), and then application of the electric current was terminated, a voltage increase on that occasion was measured, and the direct current resistance was calculated from the electric current dependence (IR loss) of the voltage decrease. The measurement temperature was 25° C.

(Charge and discharge efficiency): The lithium ion secondary battery was charged to 4.2 V at a constant current of 0.5 C (a current at which the fully charged lithium ion secondary battery is discharged in 2 hours) at 25° C., and then discharged to 2.7 V at a constant electric current of 0.5 C, and the charge capacity (C) and the discharge capacity (C) on that occasion were respectively measured to calculate the charge and discharge efficiency (discharge capacity/charge capacity×100, %).

Production Example 1

(1) Preparation of Organically Modified Clay

In a 1 L flask, 300 ml of industrial alcohol (manufactured by Japan Alcohol Trading Co., Ltd., EKINEN F-3 (trade name)) and 300 ml of distilled water were put, 15.0 g of concentrated hydrochloric acid and 64.2 g (120 mmol) of dioleylmethylamine (manufactured by Lion Corporation ARMEEN M20 (trade name)) were added, and the mixture was heated to 45° C., 100 g of synthetic hectorite (manufactured by Rockwood Additives Ltd., LAPONITE RDS (trade name)) was dispersed, and the mixture was heated to 60° C. and stirred for one hour while the temperature was kept. The slurry was subjected to filtration, followed by washing with 600 ml of water at 60° C. twice and drying in a dryer at 85° C. for 12 hours to obtain 160 g of organically modified clay. The organically modified clay was pulverized by a jet mill to a median diameter of 7 μm.

(2) Preparation of Suspension of Catalyst for Producing Polyethylene

The interior of a 300 ml flask equipped with a thermometer and a reflux tube was replaced with nitrogen, and in the flask, 25.0 g of the organically modified clay obtained in (1) and 108 ml of hexane were put, and then 0.795 g of diphenylmethylene(4-phenyl-1-indenyl)(2,7-di-t-butyl-9-fluorenyl)zirconium dichloride and 142 ml of 20% triisobutyl aluminum were added, followed by stirring at 60° C. for 3 hours. After cooling to 45° C., the supernatant liquid was withdrawn, washed with 200 ml of hexane twice, and mixed with 200 ml of hexane to obtain a suspension of catalyst for producing polyethylene (solid content by weight: 11.7 wt %).

(3) Production of Ultrahigh Molecular Weight Polyethylene Particles

In a 2 L autoclave, 1.2 L of hexane, 1.0 ml of 20% triisobutyl aluminum and 356 mg (corresponding to 41.7 mg of solid content) of the suspension of catalyst for producing polyethylene obtained in (2) were added and heated to 45° C., and ethylene was continuously supplied so that the partial pressure would be 1.6 MPa to carry out slurry polymerization of ethylene. 180 Minutes later, the autoclave was depressurized, and the slurry was subjected to filtration and dried to obtain 47.9 g of ultrahigh molecular weight polyethylene particles (1) (activity: 1,150 g/g catalyst). Physical properties of the obtained ultrahigh molecular weight polyethylene particles (1) are shown in Table 1.

Production Example 2

(1) Preparation of Organically Modified Clay

Conducted in the same manner as in Production Example 1.

(2) Preparation of Suspension of Catalyst for Producing Polyethylene

The interior of a 300 ml flask equipped with a thermometer and a reflux tube was replaced with nitrogen, and in the flask, 25.0 g of the organically modified clay obtained in (1) and 108 ml of hexane were put, and then 0.600 g of diphenylmethylene(cyclopentadienyl)(2-(dimethylamino)-9-fluorenyl)zirconium dichloride and 142 ml of 20% triisobutyl aluminum were added, followed by stirring at 60° C. for 3 hours. After cooling to 45° C., the supernatant liquid was withdrawn and washed with 200 ml of hexane twice and mixed with 200 ml of hexane to obtain a suspension of catalyst for producing polyethylene (solid content by weight: 11.5 wt %).

(3) Production of Ultrahigh Molecular Weight Polyethylene Particles

In a 2 L autoclave, 1.2 L of hexane, 1.0 ml of 20% triisobutyl aluminum and 89.9 mg (corresponding to 10.3 mg of solid content) of the suspension of catalyst for producing polyethylene obtained in (2) were added and heated to 50° C., 1.0 g of 1-butene was added, and ethylene was continuously supplied so that the partial pressure would be 1.1 MPa to carry out slurry polymerization. 180 Minutes later, the autoclave was depressurized, and the slurry was subjected to filtration and dried to obtain 65.0 g of ultrahigh molecular weight polyethylene particles (2) (activity: 6,300 g/g catalyst). Physical properties of the obtained ultrahigh molecular weight polyethylene particles (2) are shown in Table 1.

Production Example 3

(1) Preparation of Organically Modified Clay

In a 1 L flask, 300 ml of industrial alcohol (manufactured by Japan Alcohol Trading Co., Ltd., EKINEN F-3 (trade name)) and 300 ml of distilled water were put, 15.0 g of concentrated hydrochloric acid and 42.4 g (120 mmol) of dimethylbehenylamine (manufactured by Lion Corporation ARMEEN DM22D (trade name)) were added, and the mixture was heated to 45° C., 100 g of synthetic hectorite (manufactured by Rockwood Additives Ltd., LAPONITE RDS (trade name)) was dispersed, and the mixture was heated to 60° C. and stirred for one hour while the temperature was kept. The slurry was subjected to filtration, followed by washing with 600 ml of water at 60° C. twice and drying in a dryer at 85° C. for 12 hours to obtain 125 g of organically modified clay. The organically modified clay was pulverized by a jet mill to a median diameter of 7 μm.

(2) Preparation of Suspension of Catalyst for Producing Polyethylene

The interior of a 300 ml flask equipped with a thermometer and a reflux tube was replaced with nitrogen, and in the flask, 25.0 g of the organically modified clay obtained in (1) and 108 ml of hexane were put, and then 0.715 g of diphenylmethylene(cyclopentadienyl)(2-(diethylamino)-9-fluorenyl)hafnium dichloride and 142 ml of 20% triisobutyl aluminum were added, followed by stirring at 60° C. for 3 hours. After cooling to 45° C., the supernatant liquid was withdrawn, washed with 200 ml of hexane twice, and mixed with 200 ml of hexane to obtain a suspension of catalyst for producing polyethylene (solid content by weight: 12.9 wt %).

(3) Production of Ultrahigh Molecular Weight Polyethylene Particles

In a 2 L autoclave, 1.2 L of hexane, 1.0 ml of 20% triisobutyl aluminum and 108.7 mg (corresponding to 14.0 mg of solid content) of the suspension of catalyst for producing polyethylene obtained in (2) were added and heated to 65° C., and ethylene was continuously supplied so that the partial pressure would be 1.3 MPa to carry out slurry polymerization of ethylene. 180 Minutes later, the autoclave was depressurized, and the slurry was subjected to filtration and dried to obtain 130 g of ultrahigh molecular weight polyethylene particles (3) (activity: 9300 g/g catalyst). Physical properties of the obtained ultrahigh molecular weight polyethylene particles (3) are shown in Table 1.

Production Example 4

(1) Preparation of Solid Catalyst Component

In a 1 L glass flask equipped with a thermometer and a reflux tube, 50 g (2.1 mol) of a metal magnesium powder and 210 g (0.62 mol) of titanium tetrabutoxide were put, 320 g (4.3 mol) of n-butanol having 2.5 g of iodine dissolved therein was added at 90° C. over a period of 2 hours, followed by stirring at 140° C. with nitrogen sealing while generated hydrogen gas was discharged to obtain a uniform solution. Then, 2,100 ml of hexane was added.

90 g (corresponding to 0.095 mol of magnesium) of the above component was put in a separately prepared 500 ml glass flask and diluted with 59 ml of hexane. 106 ml of a hexane solution containing 0.29 mol of isobutyl aluminum dichloride was dropwise added at 45° C. over a period of 2 hours, followed by stirring at 70° C. for one hour to obtain a solid catalyst component. Remaining unreacted compounds and by-products were removed by a gradient method using hexane, and the composition was analyzed, whereupon the titanium content was 8.6 wt %.

(2) Production of Ultrahigh Molecular Weight Polyethylene

In a 2 L autoclave, 1.2 L of hexane, 1.0 ml of 20% triisobutyl aluminum and 4.2 mg of the solid catalyst component obtained in (1) were added and heated to 80° C., and ethylene was continuously supplied so that the partial pressure would be 0.6 MPa. 90 Minutes later, the autoclave was depressurized, and the slurry was subjected to filtration, followed by drying to obtain 170 g of ultrahigh molecular weight polyethylene (4) (activity: 51,000 g/g catalyst). Physical properties of the obtained ultrahigh molecular weight polyethylene (4) are shown in Table 1.

Production Example 5

(1) Preparation of organically modified clay and (2) preparation of suspension of catalyst for producing polyethylene were conducted in the same manner as in Production Example 2.

(3) Production of Ultrahigh Molecular Weight Polyethylene Particles

In a 2 L autoclave, 1.2 L of hexane, 1.0 ml of 20% triisobutyl aluminum and 95.0 mg (corresponding to 10.9 mg of solid content) of the suspension of catalyst for producing polyethylene obtained in (2) were added and heated to 60° C., a hydrogen/ethylene gas mixture containing 150 ppm of hydrogen was supplied so that the partial pressure would be 1.2 MPa, and then ethylene was continuously supplied so that the partial pressure would be 1.3 MPa to conduct slurry polymerization. 210 Minutes later, the autoclave was depressurized, and the slurry was subjected to filtration, followed by drying to obtain 75.0 g of ultrahigh molecular weight polyethylene particles (6) (activity: 6,900 g/g catalyst). Physical properties of the obtained ultrahigh molecular weight polyethylene particles (6) are shown in Table 1.

Production Example 6

(1) Preparation of organically modified clay and (2) preparation of suspension of catalyst for producing polyethylene were conducted in the same manner as in Production Example 2.

(3) Production of Ultrahigh Molecular Weight Polyethylene Particles

In a 2 L autoclave, 1.2 L of hexane, 1.0 ml of 20% triisobutyl aluminum and 85.0 mg (corresponding to 9.8 mg of solid content) of the suspension of catalyst for producing polyethylene obtained in (2) were added and heated to 60° C., 2 g of butene was added, a hydrogen/ethylene gas mixture containing 30 ppm of hydrogen was supplied so that the partial pressure would be 1.2 MPa, and then ethylene was continuously supplied so that the partial pressure would be 1.3 MPa to conduct slurry polymerization. 210 Minutes later, the autoclave was depressurized, and the slurry was subjected to filtration, followed by drying to obtain 75.0 g of ultrahigh molecular weight polyethylene particles (7) (activity: 6,900 g/g catalyst). Physical properties of the obtained ultrahigh molecular weight polyethylene particles (7) are shown in Table 1.

Production Example 7

(1) Preparation of solid catalyst component was carried out in the same manner as in Production Example 4.

(2) Production of polyethylene

In a 2 L autoclave, 1.2 L of hexane, 1.0 ml of 20% triisobutyl aluminum and 4.5 mg of the solid catalyst component obtained in (1) were added and heated to 80° C., hydrogen was introduced so that the partial pressure would be 0.03 MPa, and then ethylene was continuously supplied so that the partial pressure would be 0.6 MPa. 90 Minutes later, the autoclave was depressurized, and the slurry was subjected to filtration, followed by drying to obtain 145 g of polyethylene (activity: 32,000 g/g catalyst). The weight average molecular weight of the obtained polyethylene was $51 \times 10^4$.

Production Example 8

(1) Preparation of solid catalyst component was carried out in the same manner as in Production Example 4.

(2) Production of polyethylene

In a 2 L autoclave, 1.2 L of hexane, 1.0 ml of 20% triisobutyl aluminum and 4.8 mg of the solid catalyst component obtained in (1) were added and heated to 80° C., hydrogen was introduced so that the partial pressure would be 0.05 MPa, and then ethylene was continuously supplied so that the partial pressure would be 0.6 MPa. 90 Minutes later, the autoclave was depressurized, and the slurry was subjected to filtration, followed by drying to obtain 134 g of polyethylene (activity: 28,000 g/g catalyst). The weight average molecular weight of the obtained polyethylene was $32.1 \times 10^4$.

TABLE 1

| Ultrahigh molecular weight polyethylene | (1) | (2) | (3) | (4) | (5) | (6) | (7) |
|---|---|---|---|---|---|---|---|
| Production Example | 1 | 2 | 3 | 4 | — | 5 | 6 |
| Intrinsic viscosity ([η]) (dl/g) | 16.1 | 15.3 | 28 | 15.2 | 12.0 | 8.5 | 12.5 |

TABLE 1-continued

| Ultrahigh molecular weight polyethylene | (1) | (2) | (3) | (4) | (5) | (6) | (7) |
|---|---|---|---|---|---|---|---|
| Bulk density (kg/m$^3$) | 182 | 305 | 402 | 235 | 425 | 321 | 285 |
| Melting point at 1st scanning (° C.) (Tm$_1$) | 143.6 | 141.4 | 145.2 | 139.0 | 139.5 | 142.7 | 142.3 |
| Melting point at 2nd scanning (° C.) (Tm$_2$) | 131.5 | 129.1 | 132.3 | 131.8 | 130.7 | 132.5 | 130.8 |
| ΔTm (° C.) (=Tm$_1$ − Tm$_2$) | 12.1 | 12.3 | 12.9 | 7.2 | 8.8 | 10.2 | 11.5 |
| Ti content (ppm) | n.d.[1] | n.d.[1] | n.d.[1] | 2.0 | 0.8 | n.d.[1] | n.d.[1] |
| Tensile break strength (MPa) | 53 | 48 | 59 | 44 | 43 | 52 | 56 |
| Right-hand side of formula (a) | 48 | 42 | 48 | 48 | 46 | 49 | 47 |
| Right-hand side of formula (c) | 89 | 80 | 89 | 89 | 86 | 90 | 87 |
| Breaking stress at the time of melt-stretching (MPa) | 2.2 | 2.9 | 7.0 | 1.0 | 1.0 | 1.8 | 2.0 |
| Right-hand side of the formula (b) | 1.8 | 1.6 | 3.1 | 1.7 | 1.3 | 0.94 | 1.4 |
| Right-hand side of the formula (d) | 5.2 | 4.6 | 9.0 | 4.9 | 3.9 | 2.7 | 4.0 |
| Average particle size (μm) | 89 | 172 | 135 | 251 | 151 | 135 | 168 |

[1]At most detection limit of ICP emission spectrometer

Example 1

In a 500 ml glass flask, 14 g of the ultrahigh molecular weight polyethylene particles (1) produced in Production Example 1, 56 g of liquid paraffin (manufactured by Wako Pure Chemical Industries, Ltd., special grade), 0.13 g of Irganox1010 (trade name) (manufactured by BASF) and 0.13 g of Irgafos168 (trade name) (manufactured by BASF) as antioxidants were mixed with heating at 150° C. for one hour. The obtained mixture was kneaded by a 100 cc batch kneader (manufactured by Toyo Seiki Seisaku-sho, Ltd., Labo Plastomill 4C150 (trade name) at a kneading temperature of 190° C. at a number of revolutions of 50 rpm for 10 minutes, and the obtained mixture was compression-molded to obtain a sheet-shaped product having a thickness of 0.6 mm.

The sheet-shaped product was subjected to simultaneous biaxial stretching at a set draw ratio of 4 times in longitudinal direction×4 times in a lateral direction, washed with hexane to remove liquid paraffin, and dried to produce a stretched microporous film.

On the obtained stretched microporous film, no hole nor break was visually confirmed, and micropores were observed with an electron microscope. The film thickness, the porosity, the tensile break strength and the breaking stress at the time of melt stretching of the stretched microporous film are shown in Table 2.

Comparative Example 1

A microporous film was produced in the same manner as in Example 1 except that the ultrahigh molecular weight polyethylene (4) produced in Production Example 4 were used instead of the ultrahigh molecular weight polyethylene particles (1).

On the obtained film, no hole nor break was visually confirmed, and micropores were observed with an electron microscope. The film thickness, the porosity, the tensile break strength and the breaking stress at the time of melt-stretching of the film are shown in Table 2. The film was inferior in the tensile break strength and particularly in heat resistance.

Comparative Example 2

A microporous film was produced in the same manner as in Example 1 except that MILLION 240M (trade name) (manufactured by Mitsui Chemicals, Inc.) (hereinafter referred to as ultrahigh molecular weight polyethylene (5)) was used instead of ultrahigh molecular weight polyethylene particles (1).

On the obtained film, no hole nor break was visually confirmed, and micropores were observed with an electron microscope. The film thickness, the porosity, the tensile break strength and the breaking stress at the time of melt-stretching of the film are shown in Table 2. The film was inferior in the tensile break strength and particularly in heat resistance.

Example 2

An ultrahigh molecular weight polyethylene stretched microporous film was produced in the same manner as in Example 1 except that the ultrahigh molecular weight polyethylene particles (2) produced in Production Example 2 were used instead of the ultrahigh molecular weight polyethylene particles (1).

On the obtained stretched microporous film, no hole nor break was visually confirmed, and micropores were observed with an electron microscope. The film thickness, the porosity, the tensile break strength and the breaking stress at the time of melt-stretching of the stretched microporous film are shown in Table 2.

Example 3

An ultrahigh molecular weight polyethylene stretched microporous film was produced in the same manner as in Example 2 except that the thickness of the sheet-shaped product of the mixture was 0.9 mm, the set draw ratio was 5 times in a longitudinal direction×5 times in a lateral direction and the stretch temperature was 110° C.

On the obtained stretched microporous film, no hole nor break was visually confirmed, and micropores were observed with an electron microscope. The film thickness, the porosity, the tensile break strength and the breaking stress at the time of melt-stretching of the stretched microporous film are shown in Table 2.

Example 4

An ultrahigh molecular weight polyethylene stretched microporous film was produced in the same manner as in Example 1 except that the ultrahigh molecular weight polyethylene particles (3) produced in Production Example 3 were used instead of the ultrahigh molecular weight polyethylene particles (1).

On the obtained stretched microporous film, no hole nor break was visually confirmed, and micropores were observed with an electron microscope. The film thickness, the porosity, the tensile break strength and the breaking stress at the time of melt-stretching of the stretched microporous film are shown in Table 2.

Example 5

A sheet-shaped product having a thickness of 0.9 mm obtained in the same manner as in Example 1 except that 17.5 g the ultrahigh molecular weight polyethylene particles (1) and 52.5 g of liquid paraffin (manufactured by MORESCO Corporation, MORESCO WHITE P-350P (trade name)) were used instead of 14 g of the ultrahigh molecular weight polyethylene particles and 56 g of liquid paraffin (manufactured by Wako Pure Chemical Industries, Ltd., special grade), was subjected to successive biaxial stretching at 115° C. at the set draw ratio of 6 times in a longitudinal direction×6 times in a lateral direction, washed with methylene chloride to remove the liquid paraffin and dried to produce a stretched microporous film having a film thickness of 14 μm.

On the obtained stretched microporous film, no hole nor break was visually confirmed, and micropores were observed with an electron microscope. The film thickness, the porosity, the average pore size, the tensile break strength, the breaking stress at the time of melt-stretching, results of measurement of the heat of fusion ($\Delta H_{whole}$, $\Delta H_{>135}$) by DSC and results of measurement of the direct current resistance and the charge and discharge efficiency when applied to a lithium ion secondary battery, of the stretched microporous film, are shown in Table 2.

Example 6

An ultrahigh molecular weight polyethylene stretched microporous film having a film thickness of 13 μm was produced in the same manner as in Example 5 except that the ultrahigh molecular weight polyethylene particles (2) produced in Production Example 2 were used instead of the ultrahigh molecular weight polyethylene particles (1).

On the obtained stretched microporous film, no hole nor break was visually confirmed, and micropores were observed with an electron microscope. The film thickness, the porosity, the average pore size, the tensile break strength, the breaking stress at the time of melt-stretching, results of measurement of the heat of fusion ($\Delta H_{whole}$, $\Delta H_{>135}$) by DSC and results of measurement of the direct current resistance and the charge and discharge efficiency when applied to a lithium ion secondary battery, of the stretched microporous film, are shown in Table 2.

Example 7

An ultrahigh molecular weight polyethylene stretched microporous film having a film thickness of 14 μm was produced in the same manner as in Example 5 except that the ultrahigh molecular weight polyethylene particles (6) produced in Production Example 5 were used instead of the ultrahigh molecular weight polyethylene particles (1) and the set draw ratio was 5.5 times in a longitudinal direction× 6.5 times in a lateral direction.

On the obtained stretched microporous film, no hole nor break was visually confirmed, and micropores were observed with an electron microscope. The film thickness, the porosity, the average pore size, the tensile break strength, the breaking stress at the time of melt-stretching, results of measurement of the heat of fusion ($\Delta H_{whole}$, $\Delta H_{>135}$) by DSC and results of measurement of the direct current resistance and the charge and discharge efficiency when applied to a lithium ion secondary battery, of the stretched microporous film, are shown in Table 2.

TABLE 2

|  | Example 1 | Example 2 | Example 3 | Example 4 | Example 5 | Example 6 | Example 7 | Comparative Example 1 | Comparative Example 2 |
|---|---|---|---|---|---|---|---|---|---|
| Ultrahigh molecular weight polyethylene | (1) | (2) | (2) | (3) | (1) | (2) | (6) | (4) | (5) |
| Film thickness (μm) | 32 | 33 | 30 | 31 | 14 | 13 | 14 | 33 | 34 |
| Porosity (%) | 38 | 35 | 29 | 31 | 35 | 42 | 39 | 38 | 40 |
| Average pore size (nm) | — | — | — | — | 170 | 190 | 170 | — | — |
| Tensile break strength (MPa) | 28 | 19 | 21 | 29 | 175 | 170 | 165 | 15 | 13 |
| Heat shrinkage (%) | — | — | — | — | 1.8 | 1.9 | 1.7 | — | — |
| Breaking stress at the time of melt-stretching (MPa) | 1.8 | 1.9 | 2.0 | 4.2 | 2.2 | 2.1 | 2.0 | 0.3 | 0.2 |
| $\Delta H_{whole}$ (J/g) | — | — | — | — | 194 | 190 | 205 | — | — |
| $\Delta H_{135}$ (J/g) | — | — | — | — | 121 | 131 | 113 | — | — |
| $\Delta H_{135}/\Delta H_{whole}$ (%) | — | — | — | — | 62 | 69 | 55 | — | — |
| Direct current resistance ($\Omega \cdot cm^2$) | — | — | — | — | 8 | 7 | 7 | — | — |
| Charge and discharge efficiency (%) | — | — | — | — | 98 | 97 | 98 | — | — |

Example 8

A sheet-shaped product having a thickness of 0.9 mm obtained in the same manner as in Example 1 except that 6.3 g of the ultrahigh molecular weight polyethylene particles (1) produced in Production Example 1, 14.7 g of the polyethylene having a weight average molecular weight of $51\times10^4$ produced in Production Example 7 and 49 g of liquid paraffin (manufactured by MORESCO CORPORATION, MORESCO WHITE P-350P) (trade name)) were used instead of 14 g of the ultrahigh molecular weight polyethylene particles and 56 g of liquid paraffin (manufactured by Wako Pure Chemical Industries, Ltd., special grade), was subjected to simultaneous biaxial stretching at 115° C. at the set draw ratio of 6 times in a longitudinal direction×6 times in a lateral direction, washed with hexane to remove the liquid paraffin and dried to produce a stretched microporous film having a thickness of 12 μm.

On the obtained stretched microporous film, no hole nor break was visually confirmed, and micropores were observed with an electron microscope. Of the stretched microporous film, the intrinsic viscosity ([η]), the film thickness, the porosity, the average pore size, the heat of fusion ($\Delta H_{whole}$, $\Delta H_{>135}$) by DSC, the temperature at which the heat flux was maximum with respect to endothermic peaks by DSC within a range of at most 134° C., and the ratio of the heat flux at the temperature to the maximum heat flux, the temperature at which the heat flux was maximum within a range of at least 140° C. and the ratio of the heat flux at the temperature to the maximum heat flux, the tensile break strength, the heat shrinkage, results of measurement of the breaking stress at the time of melt-stretching, and results of measurement of the direct current resistance and the charge and discharge efficiency when applied to a lithium ion secondary battery, are shown in Table 3.

Comparative Example 3

A stretched microporous film was produced in the same manner as in Example 8 except that 6.3 g of the ultrahigh molecular weight polyethylene particles (4) produced in Production Example 4 and 14.7 g of the polyethylene having a weight average molecular weight of $51 \times 10^4$ produced in Production Example 7 were used instead of 6.3 g of the ultrahigh molecular weight polyethylene particles (1) produced in Production Example 1 and 14.7 g of the polyethylene having a weight average molecular weight of $51 \times 10^4$.

On the obtained stretched microporous film, no hole nor break was visually confirmed, and micropores were observed with an electron microscope. Of the stretched microporous film, the intrinsic viscosity (ND, the film thickness, the porosity, the average pore size, the heat of fusion ($\Delta H_{whole}$, $\Delta H_{>135}$) by DSC, the temperature at which the heat flux was maximum with respect to endothermic peaks by DSC within a range of at most 134° C., and the ratio of the heat flux at the temperature to the maximum heat flux, the tensile break strength, the heat shrinkage, results of measurement of the breaking stress at the time of melt-stretching, and results of measurement of the direct current resistance and the charge and discharge efficiency when applied to a lithium ion secondary battery, are shown in Table 3. Absorption of heat was not measured at 140° C. or higher. The film had a low tensile break strength and a high heat shrinkage, and was inferior in the direct current resistance and the charge and discharge efficiency when applied to a lithium ion secondary battery.

Example 9

A stretched microporous film having a film thickness of 13 μm was produced in the same manner as in Example 8 except that 5.3 g of the ultrahigh molecular weight polyethylene particles (2) produced in Production Example 2 and 15.7 g of the polyethylene having a weight average molecular weight of $51 \times 10^4$ produced in Production Example 7 were used instead of 6.3 g of the ultrahigh molecular weight polyethylene particles (1) produced in Production Example 1 and 14.7 g of the polyethylene having a weight average molecular weight of $51 \times 10^4$.

On the obtained stretched microporous film, no hole nor break was visually confirmed, and micropores were observed with an electron microscope. Of the stretched microporous film, the intrinsic viscosity ([η]), the film thickness, the porosity, the average pore size, the heat of fusion ($\Delta H_{whole}$, $\Delta H_{>135}$) by DSC, the temperature at which the heat flux was maximum with respect to endothermic peaks by DSC within a range of at most 134° C., and the ratio of the heat flux at the temperature to the maximum heat flux, the temperature at which the heat flux was maximum within a range of at least 140° C. and the ratio of the heat flux at the temperature to the maximum heat flux, the tensile break strength, the heat shrinkage, results of measurement of the breaking stress at the time of melt-stretching, and results of measurement of the direct current resistance and the charge and discharge efficiency when applied to a lithium ion secondary battery, are shown in Table 3.

Example 10

A stretched microporous film having a film thickness of 13 μm was produced in the same manner as in Example 8 except that 6.3 g of the ultrahigh molecular weight polyethylene particles (2) produced in Production Example 2 and 14.7 g of the polyethylene having a weight average molecular weight of $32.1 \times 10^4$ produced in Production Example 8 were used instead of 6.3 g of the ultrahigh molecular weight polyethylene particles (1) produced in Production Example 1 and 14.7 g of the polyethylene having a weight average molecular weight of $51 \times 10^4$.

On the obtained stretched microporous film, no hole nor break was visually confirmed, and micropores were observed with an electron microscope. Of the stretched microporous film, the intrinsic viscosity ([η]), the film thickness, the porosity, the average pore size, the heat of fusion ($\Delta H_{whole}$, $\Delta H_{>135}$) by DSC, the temperature at which the heat flux was maximum with respect to endothermic peaks by DSC within a range of at most 134° C., and the ratio of the heat flux at the temperature to the maximum heat flux, the temperature at which the heat flux was maximum within a range of at least 140° C. and the ratio of the heat flux at the temperature to the maximum heat flux, the tensile break strength, the heat shrinkage, results of measurement of the breaking stress at the time of melt-stretching, and results of measurement of the direct current resistance and the charge and discharge efficiency when applied to a lithium ion secondary battery, are shown in Table 3.

Example 11

A stretched microporous film having a film thickness of 12 μm was produced in the same manner as in Example 8 except that 3.2 g of the ultrahigh molecular weight polyethylene particles (3) produced in Production Example 3 and 17.8 g of the polyethylene having a weight average molecular weight of $51 \times 10^4$ produced in Production Example 7 were used instead of 6.3 g of the ultrahigh molecular weight polyethylene particles (1) produced in Production Example 1 and 14.7 g of the polyethylene having a weight average molecular weight of $51 \times 10^4$.

On the obtained stretched microporous film, no hole nor break was visually confirmed, and micropores were observed with an electron microscope. Of the stretched microporous film, the intrinsic viscosity ([η]), the film thickness, the porosity, the average pore size, the heat of fusion ($\Delta H_{whole}$, $\Delta H_{>135}$) by DSC, the temperature at which the heat flux was maximum with respect to endothermic peaks by DSC within a range of at most 134° C., and the ratio of the heat flux at the temperature to the maximum heat flux, the temperature at which the heat flux was maximum within a range of at least 140° C. and the ratio of the heat flux at the temperature to the maximum heat flux, the tensile break strength, the heat shrinkage, results of measurement of the breaking stress at the time of melt-stretching, and results of measurement of the direct current resistance and the charge and discharge efficiency when applied to a lithium ion secondary battery, are shown in Table 3.

Example 12

A stretched microporous film having a film thickness of 13 μm was produced in the same manner as in Example 8 except that 8.4 g of the ultrahigh molecular weight polyethylene particles (6) produced in Production Example 5 and 12.6 g of the polyethylene having a weight average molecular weight of $51 \times 10^4$ produced in Production Example 7 were used instead of 6.3 g of the ultrahigh molecular weight polyethylene particles (1) produced in Production Example 1 and 14.7 g of the polyethylene having a weight average molecular weight of $51 \times 10^4$.

On the obtained stretched microporous film, no hole nor break was visually confirmed, and micropores were observed with an electron microscope. Of the stretched microporous film, the intrinsic viscosity ($[\eta]$), the film thickness, the porosity, the average pore size, the heat of fusion ($\Delta H_{whole}$, $\Delta H_{>135}$) by DSC, the temperature at which the heat flux was maximum with respect to endothermic peaks by DSC within a range of at most 134° C., and the ratio of the heat flux at the temperature to the maximum heat flux, the temperature at which the heat flux was maximum within a range of at least 140° C. and the ratio of the heat flux at the temperature to the maximum heat flux, the tensile break strength, the heat shrinkage, results of measurement of the breaking stress at the time of melt-stretching, and results of measurement of the direct current resistance and the charge and discharge efficiency when applied to a lithium ion secondary battery, are shown in Table 3.

Example 13

A stretched microporous film having a film thickness of 13 μm was produced in the same manner as in Example 8 except that the ultrahigh molecular weight polyethylene particles (7) produced in Production Example 6 and the polyethylene having a weight average molecular weight of $32.1 \times 10^4$ produced in Production Example 8 were used instead of the ultrahigh molecular weight polyethylene particles (1) produced in Production Example 1 and the polyethylene having a weight average molecular weight of $51 \times 10^4$.

On the obtained stretched microporous film, no hole nor break was visually confirmed, and micropores were observed with an electron microscope. Of the stretched microporous film, the intrinsic viscosity ($[\eta]$), the film thickness, the porosity, the average pore size, the heat of fusion ($\Delta H_{whole}$, $\Delta H_{>135}$) by DSC, the temperature at which the heat flux was maximum with respect to endothermic peaks by DSC within a range of at most 134° C., and the ratio of the heat flux at the temperature to the maximum heat flux, the temperature at which the heat flux was maximum within a range of at least 140° C. and the ratio of the heat flux at the temperature to the maximum heat flux, the tensile break strength, the heat shrinkage, results of measurement of the breaking stress at the time of melt-stretching, and results of measurement of the direct current resistance and the charge and discharge efficiency when applied to a lithium ion secondary battery, are shown in Table 3.

TABLE 3

|  | Example 8 | Example 9 | Example 10 | Example 11 | Example 12 | Example 13 | Comparative Example 3 |
|---|---|---|---|---|---|---|---|
| Ultrahigh molecular weight polyethylene | (1) | (2) | (2) | (3) | (6) | (7) | (4) |
| Weight average molecular weight of polyethylene ($\times 10^4$) | 51 | 51 | 32.1 | 51 | 51 | 32.1 | 51 |
| Ultrahigh molecular weight polyethylene/polyethylene (wt %/wt %) | 30/70 | 25/75 | 30/70 | 15/85 | 40/60 | 30/70 | 30/70 |
| Intrinsic viscosity of composition ($[\eta]$) (dl/g) | 8.0 | 7.0 | 6.9 | 7.9 | 5.9 | 6.1 | 7.5 |
| Ratio of intrinsic viscosity of composition to intrinsic viscosity of ultrahigh molecular weight polyethylene | 0.50 | 0.46 | 0.45 | 0.28 | 0.69 | 0.48 | 0.49 |
| Film thickness (μm) | 12 | 13 | 13 | 12 | 13 | 13 | 13 |
| Porosity (%) | 47 | 45 | 49 | 52 | 38 | 43 | 44 |
| Average pore size (nm) | 180 | 160 | 180 | 190 | 150 | 160 | 220 |
| $\Delta H_{whole}$ (J/g) | 205 | 198 | 210 | 197 | 207 | 197 | 205 |
| $\Delta H_{135}$ (J/g) | 107 | 93 | 101 | 112 | 114 | 95 | 80 |
| $\Delta H_{135}/\Delta H_{whole}$ (%) | 52 | 47 | 48 | 57 | 55 | 48 | 39 |
| Temperature at which endothermic heat flux is maximum at 134° C. or lower ($T_L$) | 134 | 134 | 133 | 134 | 134 | 134 | 134 |
| (Endothermic heat flux at $T_L$)/(maximum heat flux among endothermic peaks) (%) | 75 | 64 | 58 | 72 | 65 | 70 | 90 |
| Temperature at which endothermic heat flux is maximum at 140° C. or higher ($T_H$) | 140 | 141 | 142 | 143 | 140 | 140 | No heat absorption |
| (Endothermic heat flux at $T_H$)/(maximum endothermic heat flux among endothermic peaks) (%) | 67 | 95 | 100 | 72 | 80 | 90 | — |
| Tensile break strength (MPa) | 198 | 168 | 182 | 192 | 175 | 172 | 145 |
| Heat shrinkage | 1.5 | 1.3 | 1.4 | 1.8 | 1.1 | 1.2 | 2.7 |
| Breaking stress at the time of melt-stretching (MPa) | 2.5 | 2.2 | 2.3 | 2.8 | 2.0 | 2.2 | 0.3 |
| Direct current resistance ($\Omega \cdot cm^2$) | 7 | 6 | 6 | 6 | 7 | 7 | 16 |
| Charge and discharge efficiency (%) | 98 | 97 | 98 | 98 | 97 | 98 | 85 |

The present invention has been described in detail with reference to specific embodiments, but, it is obvious for the person skilled in the art that various changes and modifications are possible without departing from the intension and the scope of the present invention.

The entire disclosure of Japanese Patent Application No. 2014-063068 filed on Mar. 26, 2014 including specification, claims and summary is incorporated herein by reference in its entirety.

INDUSTRIAL APPLICABILITY

The ultrahigh molecular weight polyethylene stretched microporous film of the present invention, which is excellent in strength, heat resistance and durability at high temperature and can be made thin, is useful for various applications such as a gas separation membrane, a semipermeable membrane, a tape, a tube, a separator for a battery such as a lead-acid battery, a nickel-metal hydride battery, a lithium battery or a lithium ion secondary batter, etc., and can constitute a lithium ion secondary battery having excellent electrical properties when employed as a separator for a lithium ion secondary battery.

The invention claimed is:

1. An ultrahigh molecular weight polyethylene stretched microporous film, which comprises at least an ultrahigh molecular weight polyethylene having an intrinsic viscosity ([η]) of at least 7 dl/g and at most 60 dl/g, and which has a porosity of at least 10% and at most 70% and a breaking stress of at least 1 MPa when melt-stretched at 150° C.

2. The ultrahigh molecular weight polyethylene stretched microporous film according to claim 1, wherein $\Delta H_{>135}/\Delta H_{whole}$ is at least 40%, where $\Delta H_{whole}$ is a total heat of fusion and $\Delta H_{>135}$ is a heat of fusion at 135° C. or higher, and $\Delta H_{>135}$ and $\Delta H_{whole}$ are measured as endothermic peaks due to fusion by a differential scanning calorimeter (DSC) at a time when heated from 0° C. to 230° C. at a temperature-raising rate of 10° C./min.

3. The ultrahigh molecular weight polyethylene stretched microporous film according to claim 1, which is obtained by mixing ultrahigh molecular weight polyethylene particles and an organic solvent at a temperature of at least 50° C. and at most 300° C. to form a sheet-shaped product, subjecting the sheet-shaped product to biaxial stretching at a draw ratio of at least 2 times×2 times, and removing the organic solvent, wherein the ultrahigh molecular weight polyethylene particles satisfy at least the following conditions (1) to (3):

(1) an intrinsic viscosity ([η]) of at least 7 dl/g and at most 60 dl/g;

(2) a bulk density of at least 130 kg/m³ and at most 700 kg/m³; and (3) a difference ($\Delta Tm = Tm_1 - Tm_2$) between $Tm_1$ and $Tm_2$ of at least 9° C. and at most 30° C., where $Tm_1$ is a melting point at a 1st scanning at a time when heated from 0° C. to 230° C. at a temperature-raising rate of 10° C./min by differential scanning calorimeter (DSC), and $Tm_2$ is a melting point at a 2nd scanning at a time when left to stand for 5 minutes after the 1st scanning, cooled to −20° C. at a temperature-decreasing rate of 10° C./min, left to stand for 5 minutes, and then heated from −20° C. to 230° C. at a temperature-raising rate of 10° C./min.

4. The ultrahigh molecular weight polyethylene stretched microporous film according to claim 1, which comprises an ultrahigh molecular weight polyethylene composition containing at least an ultrahigh molecular weight polyethylene having an intrinsic viscosity ([η]) of at least 7 dl/g and at most 60 dl/g and a polyethylene having a weight average molecular weight of at most 800,000.

5. The ultrahigh molecular weight polyethylene stretched microporous film according to claim 4, $\Delta H_{>135}/\Delta H_{whole}$ is at least 40% and at most 80% and $\Delta H_{whole}$ is at least 190 J/g, where $\Delta H_{whole}$ is the total heat of fusion and $\Delta H_{>135}$ is the heat of fusion at 135° C. or higher, and $\Delta H_{>135}$ and $\Delta H_{whole}$ are measured as endothermic peaks due to fusion by a differential scanning calorimeter (DSC) at a time when heated from 0° C. to 230° C. at a temperature-raising rate of 10° C./min.

6. The ultrahigh molecular weight polyethylene stretched microporous film according to claim 4, wherein, when heated from 0° C. to 230° C. at a temperature-raising rate of 10° C./min by DSC, within ranges of at most 134° C. and at least 140° C., there is a temperature at which the maximum endothermic heat flux (W/g) within said temperature ranges is at least 60% of the maximum heat flux (W/g) in the total fusion peaks.

7. The ultrahigh molecular weight polyethylene stretched microporous film according to claim 1, which has a tensile break strength measured at 23° C. of at least 150 MPa and a heat shrinkage of at most 2%.

8. The ultrahigh molecular weight polyethylene stretched microporous film according to claim 1, which is at least one member selected from the group consisting of a gas separation membrane, a semipermeable membrane, a tape, a tube and a battery separator.

* * * * *